(12) United States Patent
Reid (10) Patent No.: US 10,358,165 B2
(45) Date of Patent: Jul. 23, 2019

(54) KINGPIN UNIT BEARING STEERABLE DRIVE AXLE ASSEMBLY

(71) Applicant: Dennis Reid, Pleasant Hill, CA (US)

(72) Inventor: Dennis Reid, Pleasant Hill, CA (US)

( * ) Notice: Subject to any disclaimer, the term of this patent is extended or adjusted under 35 U.S.C. 154(b) by 268 days.

(21) Appl. No.: 15/147,436

(22) Filed: May 5, 2016

(65) Prior Publication Data

US 2017/0036693 A1    Feb. 9, 2017

Related U.S. Application Data

(60) Provisional application No. 62/201,370, filed on Aug. 5, 2015.

(51) Int. Cl.
| B62D 7/18 | (2006.01) |
| B60K 17/30 | (2006.01) |
| B60B 27/00 | (2006.01) |

(52) U.S. Cl.
CPC ............ B62D 7/18 (2013.01); B60B 27/0036 (2013.01); B60K 17/306 (2013.01)

(58) Field of Classification Search
CPC ...... B60B 27/0036; B62D 7/18; B60K 17/02; B60K 17/306
See application file for complete search history.

(56) References Cited

U.S. PATENT DOCUMENTS

| 1,697,784 A | 10/1923 | Seaholm |
| 3,549,166 A | 12/1970 | Moore et al. |
| 4,037,680 A | 7/1977 | Grove |
| 4,282,949 A * | 8/1981 | Kopich ................. B60K 17/30 180/247 |
| 4,337,581 A * | 7/1982 | Eck ........................ G01B 5/255 33/203.18 |
| 4,337,953 A | 7/1982 | Ikeda et al. |
| 5,353,890 A | 10/1994 | Clohessy |
| 5,518,302 A | 5/1996 | Bemoni |

(Continued)

FOREIGN PATENT DOCUMENTS

| DE | 19700313 | 7/1997 |
| WO | WO-2015067638 A2 * | 5/2015 ............. B60G 7/008 |

OTHER PUBLICATIONS

Webarchive Reid Racing website [online]. [Retrieved on Dec. 20, 2017]. Retrieved from the Internet: <URL:https://web.archive.org/web/20141008091945/http://www.reidracing.biz:80/off-road-products/dana-60-knuckles/ford-superduty-highsteer-knuckle>. (Year: 2014).*

(Continued)

*Primary Examiner* — Barry Gooden, Jr.
(74) *Attorney, Agent, or Firm* — Beusse, Wolter, Sanks & Maire PLLC; Robert L. Wolter (57) ABSTRACT

A kingpin unit bearing steerable drive axle for a powered wheel of a vehicle may include a steering knuckle having a first side and a second side, and a unit bearing configured to support a wheel and operatively connected to the first side of the steering knuckle. An axle housing is operatively connected to the second side of the steering knuckle, and the axle housing has an upper arm and a lower arm. A first kingpin connects the upper arm of the axle housing to the steering knuckle; and a second kingpin connects the lower arm of the axle housing to the steering knuckle. The steering knuckle and the axle housing are configured to receive a powered axle shaft to drive the unit bearing.

3 Claims, 5 Drawing Sheets

(56) References Cited

U.S. PATENT DOCUMENTS

| | | | |
|---|---|---|---|
| 5,538,273 A * | 7/1996 | Osenbaugh | B62D 17/00 280/86.756 |
| 5,740,895 A * | 4/1998 | Bigley | B60K 17/3515 192/69.41 |
| 5,749,594 A * | 5/1998 | Krisher | B62D 17/00 280/124.1 |
| 5,839,749 A * | 11/1998 | Lyu | B60G 15/067 280/86.753 |
| 5,941,335 A * | 8/1999 | Krisher | B60B 27/00 180/254 |
| 5,957,987 A * | 9/1999 | Sudo | B60T 8/1755 180/412 |
| 6,029,986 A | 2/2000 | Bodin et al. | |
| 6,079,512 A * | 6/2000 | Krisher | B60G 7/008 180/254 |
| 6,099,003 A | 8/2000 | Olszewski et al. | |
| 6,318,492 B1 * | 11/2001 | Goddard | B60K 17/3515 180/247 |
| 6,318,533 B1 * | 11/2001 | Krisher | B60K 17/306 180/247 |
| 6,336,537 B1 * | 1/2002 | Krisher | B60K 17/3515 192/43 |
| 6,398,240 B1 | 6/2002 | Taylor | |
| 6,408,973 B1 * | 6/2002 | Beesley | B60K 17/306 180/245 |
| 6,502,839 B1 * | 1/2003 | Chino | B62D 7/18 280/93.512 |
| 6,616,156 B1 | 9/2003 | Dudding et al. | |
| 7,143,883 B2 * | 12/2006 | McCalla | F16D 3/223 192/109 R |
| 7,574,926 B2 * | 8/2009 | Anderson | A01D 46/08 73/862.325 |
| 7,976,036 B2 | 7/2011 | Reid | |
| 2002/0089141 A1 | 7/2002 | Bennett et al. | |
| 2002/0114552 A1 | 8/2002 | Csik | |
| 2003/0132584 A1 * | 7/2003 | Borroni-Bird | B60G 3/18 280/5.5 |
| 2004/0141675 A1 | 7/2004 | Kapaan et al. | |
| 2004/0235606 A1 * | 11/2004 | Brossard | B60K 17/306 475/222 |
| 2005/0073122 A1 * | 4/2005 | LeBlanc, Sr. | B60G 3/24 280/93.502 |
| 2005/0280229 A1 * | 12/2005 | Ingalls | B62D 17/00 280/86.756 |
| 2006/0237251 A1 * | 10/2006 | LeBlanc, Sr. | B60G 3/20 180/252 |
| 2013/0240282 A1 * | 9/2013 | Bindl | B60K 7/00 180/255 |
| 2014/0054954 A1 * | 2/2014 | Hofmann | B60B 27/065 301/111.03 |
| 2014/0361505 A1 * | 12/2014 | Ormiston | B62D 7/18 280/93.512 |
| 2016/0318363 A1 * | 11/2016 | Bonera | B60G 7/008 |

OTHER PUBLICATIONS

Reid Racing Heavy Duty High Steer Ford Superduty (2005+) Knuckle flyer [online]. [Retrieved on Dec. 20, 2017]. Retrieved from the Internet: <URL:http://www.pirate4x4.com/forum/axles-tires-wheels/734925-reid-racing-dedenbear-knuckles-cheap-26.html>. (Year: 2014).*

Installation Instructions D60002FR [online]. [Retrieved on Dec. 20, 2017]. Retrieved from the Internet: <URL:http://webcache.googleusercontent.com/search?q=cache:2bFXEXVWIEkJ:www.reidracing.biz/LiteratureRetrieve.aspx%3FID%3D224268+&cd=1&hl=en&ct=clnk&gl=us>. (Year: 2015).*

Machine Translation of WO2015067638A2.*

Reid Racing D60002FR Steering Knuckle Installation Instructions, Dec. 2014.

Reid Racing D60002FR Steering Knuckle Flyer, Aug. 2014.

SAE Technical Paper Series: Formula SAE Suspension Design, 2005.

* cited by examiner

KINGPIN UNIT BEARING STEERABLE DRIVE AXLE ASSEMBLY

FIELD OF THE INVENTION

This invention relates to drive axle assemblies of a motor vehicle and more specifically to powered steerable drive axle assemblies including unit bearings that support wheels of a vehicle.

BACKGROUND OF THE INVENTION

Almost all motor vehicles share a common basic design. A motor vehicle is comprised of a body supported by wheels, an engine to provide power, a transmission to provide multiple gear selections for accelerating the vehicle, and at least one powered axle assembly to transmit power from the transmission to the wheels of the vehicle. Throughout history, most powered axle assemblies have been a rigid one piece housing containing gears, axle shafts, and brakes with wheel attachments at the outer ends of the housing. These rigid axle assemblies are typically known as "solid" or "live" axles. The housing is typically located at the rear of the vehicles and therefore drives the rear wheels.

More and more vehicles are now using the front axle to power the wheels and these are typically known as "front wheel drive" vehicles. Vehicles which are intended to be used in off-road conditions almost always have all wheels driving i.e., both the front and rear wheels are powered thereby doubling the motive force available to power the vehicle through rough or slippery terrain. In both front wheel drive and all-wheel drive vehicles, there must be a method to transmit power through the axle assembly while at the same time being able to turn the wheels side to side as required for steering. The term drive axle assembly or steerable drive axle assembly as used above and herein is intended to mean or encompass such assemblies, and their components, that drive or power one or more front or rear wheels of a vehicle.

In all cases, the drive axle assembly has some sort of swiveling mechanism at the end of the assembly that is connected to a steering knuckle. The steering knuckle can rotate side to side to provide steering and is connected to the axle housing on one side and to a wheel support assembly on the other side. There typically is a large opening in the middle of the steering knuckle to enable a drive/axle shaft to pass through it. In addition, there is some sort of connection joint in the drive/axle shaft to allow power to be transmitted by the shaft through various angles as the wheels are steered. These connections are usually either conventional universal joints or CV (constant velocity) joints. The end of the axle/drive shaft attaches to the wheel and provides power to that particular wheel.

Until the late 20th century, the standard arrangement for a steerable drive axle assembly, particularly in all wheel drive vehicles, was a "solid" or "live" axle housing. At the ends of the housing, an inner yoke commonly called a "C" in slang terms, was attached. It is called a "C" because it looks like a "C" when looking at it from a side view. The drive/axle shaft passes through the middle of the "C" and the arms of the "C" provide the attachment points for the swiveling mechanisms that connect to the steering knuckles. Located in the middle of the "C" is the axle shaft swivel joint (Universal or CV joint).

The steering knuckle swiveling mechanisms were typically kingpin assemblies. In non-powered steering axles, the kingpin is a shaft that is held stationary by the axle housing ends and some sort of bearing is attached to the top and bottom of each steering knuckle to allow the knuckle to rotate about the kingpin. This arrangement obviously cannot be used on a powered steering axle since it has a drive/axle shaft passing through the middle of the steering knuckle. In a powered axle, there is usually a short kingpin attached to each arm of the "C" and the steering knuckle bearings attach and swivel about these short kingpins. The advantage of the kingpin style of axle assembly is that it is incredibly strong and reliable. A disadvantage is that they are relatively complicated with numerous parts required, and trained mechanics are needed to assemble or service the parts correctly.

In the late 20th century, in an effort to decrease costs along with simplifying the design and assembly, automotive manufacturers replaced the kingpins with ball joints. Ball joints consist of a spherical metal bulb with a tapered threaded stud attached to the bulb. The bulb is surrounded by some sort of bearing material and the whole assembly is encased in a metal housing. The ball joints are manufactured as an assembly at a factory and are supplied to the user as a completed unit. In use, the automotive assembler merely presses the ball joint assembly into the suspension housing and then slides the stud into a matching hole of the steering knuckle (or vice versa depending on the design). A nut is screwed onto the stud and tightened. The assembly is complete at this point. Relatively untrained assembly personnel can assemble an axle housing quickly without needing to have mechanic skills. Most vehicles, particularly passenger cars, have used this type of assembly continuously since the 1950's.

Ball joints work exceptionally well in vehicles with low suspension loads, but they typically wear and fail quickly under severe duty usage, especially in driven axles. This is because not only do the ball joints have to support the vehicle weight, road impacts, and steering forces, but additionally must resist the torque induced twisting due to power being applied to the wheels. Many off road enthusiasts equip their vehicles with oversize tires and wheels that have larger offsets with which the vehicles were originally equipped. These changes drastically increase the loads applied to the ball joints thereby shortening the lifespan. In many cases, ball joints need to be replaced in as little as 30,000 miles on a street driven vehicle or between every race on a racing vehicle. Attempts have been made to improve the design and materials of ball joints, but success has not been great, mainly due to the fact that the inherent ball joint geometry is limited in its ability to absorb random suspension loads coming from all different directions.

Another 20th century axle design feature is that the steering knuckle provided an attachment point for a wheel spindle. A spindle is a hollow tube with a flange on the end of it. The flange attaches to the knuckle. The outside of the spindle tube provides a place for wheel bearings to reside and the hole through the middle of the spindle allows the drive/axle shaft to pass through. The wheel bearings support a hub that attaches to the brakes and the wheel and they allow the wheel to spin as the vehicle drives down the road. This spindle design is extremely rugged and is completely serviceable if any parts wear out. Just like the kingpin design, the disadvantage to the design is the numerous parts that need to be assembled and adjusted after assembly.

A change that was made a few years after the change from kingpins to ball joints was the replacement of spindle mounted wheel assemblies with unit bearing assemblies. As mentioned before, spindle mounted wheel assemblies are expensive to manufacture and assemble since they consist of numerous components that have to be carefully assembled by trained mechanics. Unit bearing assemblies are simplified combined bearing and wheel hub components assembled in a factory. The units are supplied to the automotive manufacturer as a complete unit that is simply slipped into a receiver bore in the steering knuckle and typically 3 or 4 nuts are screwed on and tightened. Like the ball joints, assembly is very quick using untrained mechanics thereby speeding assembly and cutting costs.

Unit bearings have a similar problem as ball joints in that they typically don't hold up as well as previous designs under severe duty usage, especially with oversize tires and larger wheel offsets. Recognizing this problem, auto manufacturers have recently redesigned unit bearings destined for severe duty vehicles. The newer design unit bearings are manufactured with much larger and heavier components inside the unit along with spacing the bearings farther apart. All of these changes make for a much more rugged unit. The placement of the unit bearings within the steering knuckle allow for the increased size. Unlike ball joints, there is room to install essentially scaled up versions of previous unit bearings.

SUMMARY OF THE INVENTION

The inventor of the invention described herein has developed a kingpin unit bearing steerable drive axle assembly for a powered wheel that corrects the inherent deficiencies in modern steerable driven axles. Embodiments of the invention may comprise a kingpin style axle steering knuckle that can accept modern large unit bearing wheel support assemblies. The invention may comprise replacing the axle housing (also referred to as a yolk, "C" or "inner C") on an existing axle with a specially designed "C" capable of accepting kingpin assemblies. The invention may also comprise a matching steering knuckle that accepts kingpins and an unit bearing. Most components from the existing axle can be utilized, only the "C", steering knuckle, and tie rod need to be replaced. Brakes, unit bearings, speed sensors, wheels, axle housing, and vacuum lock out hub components can be directly transferred to the improved axle assembly.

The steering knuckle of the present invention may have cast in steering arms and provisions may be made to utilize "high steer" steering arms. "High steer" arms are steering arms that are bolted to the top of the steering knuckle thereby moving the tie rod and other steering components to the top of the axle. This protects the steering components from damage caused when the axle smashes against obstacles in the roadway or trail. It also helps maintain stable steering. When large tires are used on a vehicle, the vehicle needs to be raised up or "lifted" to allow clearance between the body and the tires. This results in altered steering geometry which creates unstable driving characteristics. By moving the steering components to the top of the steering knuckle, steering geometry is corrected and stability now mimics the original vehicle configuration.

An advantage of this axle assembly is that the failure prone ball joints are replaced with proven rugged kingpins while maintaining the simplicity of unit bearing wheel assemblies. A preferred embodiment utilizes kingpin assemblies manufactured by the Dana Corporation for driven steerable axles used between 1975 and 1993 by Ford, General Motors and Dodge Corp. These axles are coveted by off-road enthusiasts for their rugged ability to absorb punishment. By using combinations of off-the-shelf existing or pre-existing components, the preferred embodiment allows a minimized cost heavy duty axle assembly to be created while having ready availability of commonly sourced parts.

An embodiment may also allow use of the vacuum applied lock-out hubs for the wheels. Lock-out hubs are assemblies that are attached to the outer ends of the axle shafts and they connect the axle shaft to the wheels. In order to minimize wear, vibration, and fuel consumption, it is desirable to disconnect the wheels from the axle shafts when the vehicle is not being used in off road conditions. Lock-out hubs provide this driver selectable disconnect by means of a vacuum system to control the operation of the hubs.

The term original equipment manufacturer or OEM or OEM type as used herein and above includes the parts and components from such manufacturers, matching parts or components made by others, replacement parts that match dimension for dimension or piece for piece the OEM parts, or any other such parts including but not limited to, any aftermarket parts.

DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings.

DESCRIPTION OF THE INVENTION

Reference will now be made in detail to the embodiments consistent with the invention, examples of which are illustrated in the accompanying drawings. Wherever possible, the same reference numerals are used throughout the drawings and refer to the same or like parts. For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the preceding definitions are provided. It is further noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item.

Figure 1:
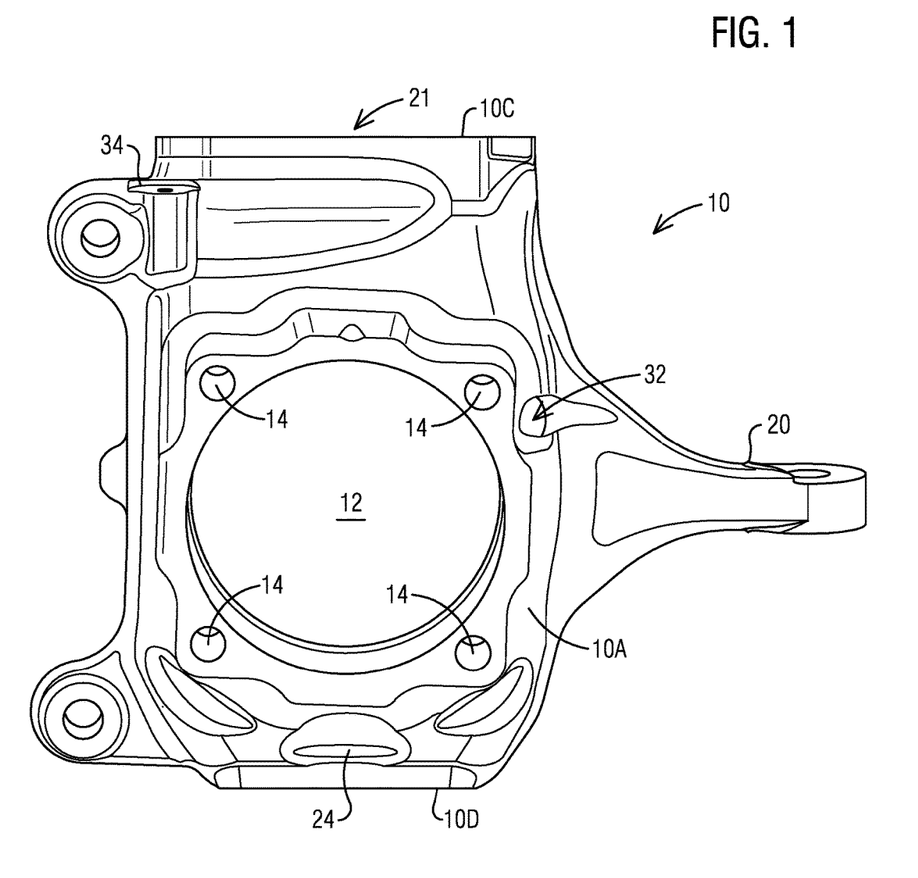
FIG. 1 is an elevational view of a first side a steering knuckle in accordance with aspects of the invention.
Figure 2:
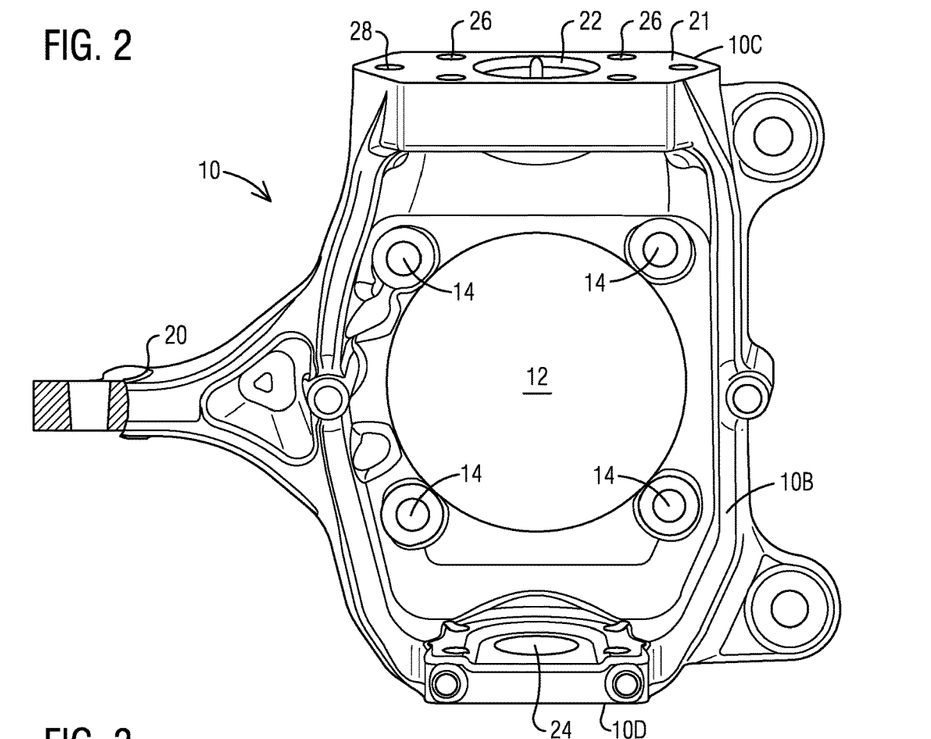
FIG. 2 is an elevational view of a second side of the steering knuckle of FIG. 1.
Figure 3:
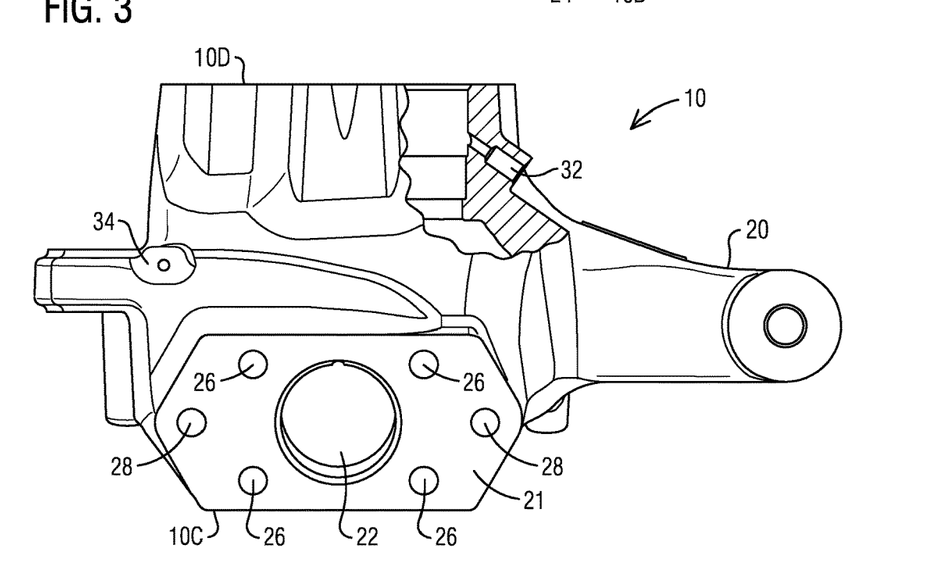
FIG. 3 is a top view of the steering knuckle of FIG. 1.

With respect to FIGS. 1-3, there is illustrated an embodiment of a novel steering knuckle 10 that includes a first side 10A that is configured to match or receive the OEM parts or components of a unit bearing. In addition, the steering knuckle 10 comprises a second side 10B that is configured to match or receive an axle housing of a vehicle manufactured to include a unit-bearing front axle assembly. For example, the steering knuckle 10 includes a boring 12 through the first side 10A and a second side 10B, and apertures 14 are spaced circumferentially around the boring 12, wherein the boring 12 and apertures 14 are configured for receiving and affixing an OEM or aftermarket unit bearing to the steering knuckle 10. In addition, the second side 10B of the steering knuckle 10 includes an upper kingpin aperture 22 and a lower kingpin aperture 24 positioned on the knuckle 10 and configured to receive kingpins for attachment of an axle housing as described in more detail below.

Note the steering knuckle 10 also includes a steering arm 20 to which a vehicle steering assembly is linked. In addition, a mounting area 21 is provided at a top end 10C of the knuckle 10 for attaching an extension (not shown) in order to link a steering assembly to the knuckle 10. This feature is provided in order to raise the link between the steering knuckle 10 and the steering assembly to account for the suspension of the vehicle being raised relative to its original manufacturing. The steering arm 20 and high steer arm are preferably of a sufficient length to use a straight tie rod for steering as opposed to a bent tie rod for shorter steering arms.

As noted above, the steering knuckle 10 includes an upper kingpin aperture 22 and a lower kingpin aperture 24. The upper kingpin aperture 22 is configured to receive an OEM upper kingpin and kingpin assembly. In addition, the lower kingpin aperture 24 in a bottom end 10D of the steering knuckle is configured to receive an OEM lower kingpin and kingpin assembly. In an embodiment, the knuckle 10 and kingpin apertures 22 and 24 may be configured to receive Dana 60 kingpin assemblies to be used with Super Duty Dana 60 axle shaft. Such axle shafts may be OEM axle shafts. However, the invention is not so limited and could be used with for example an aftermarket unit bearing and/or aftermarket axle shafts and/or aftermarket universal joints.

With respect to FIG. 3, the mounting area 21 may include a first set of apertures 26 that are positioned about the upper kingpin apertures 22 for mounting an OEM kingpin spring retainer assembly onto the top of the knuckle 10 and an upper kingpin. Apertures 26 and additional apertures 28 are provided for mounting a high steering arm to the top of the knuckle 10, which may also serve as a retainer to an upper kingpin; however, additional apertures 28 may not be required for additional mounting strength.

Again in reference to FIGS. 1 and 3, the knuckle 10 may include a vacuum port 32 to connect a vacuum line to a lock-out hub on a unit bearing. The vacuum line (not shown) is used to automatically control the engagement and disengagement of the lock-out hub when converting from four-wheel drive to two-wheel drive or vice versa. In addition, a boss 34 may be provided for mounting and clamping sensor wire(s) for a wheel speed sensor of the unit bearing. In addition, or alternatively, the boss 34 could be used for mounting a securing a vacuum hose connected to vacuum port 32.

Figure 4:
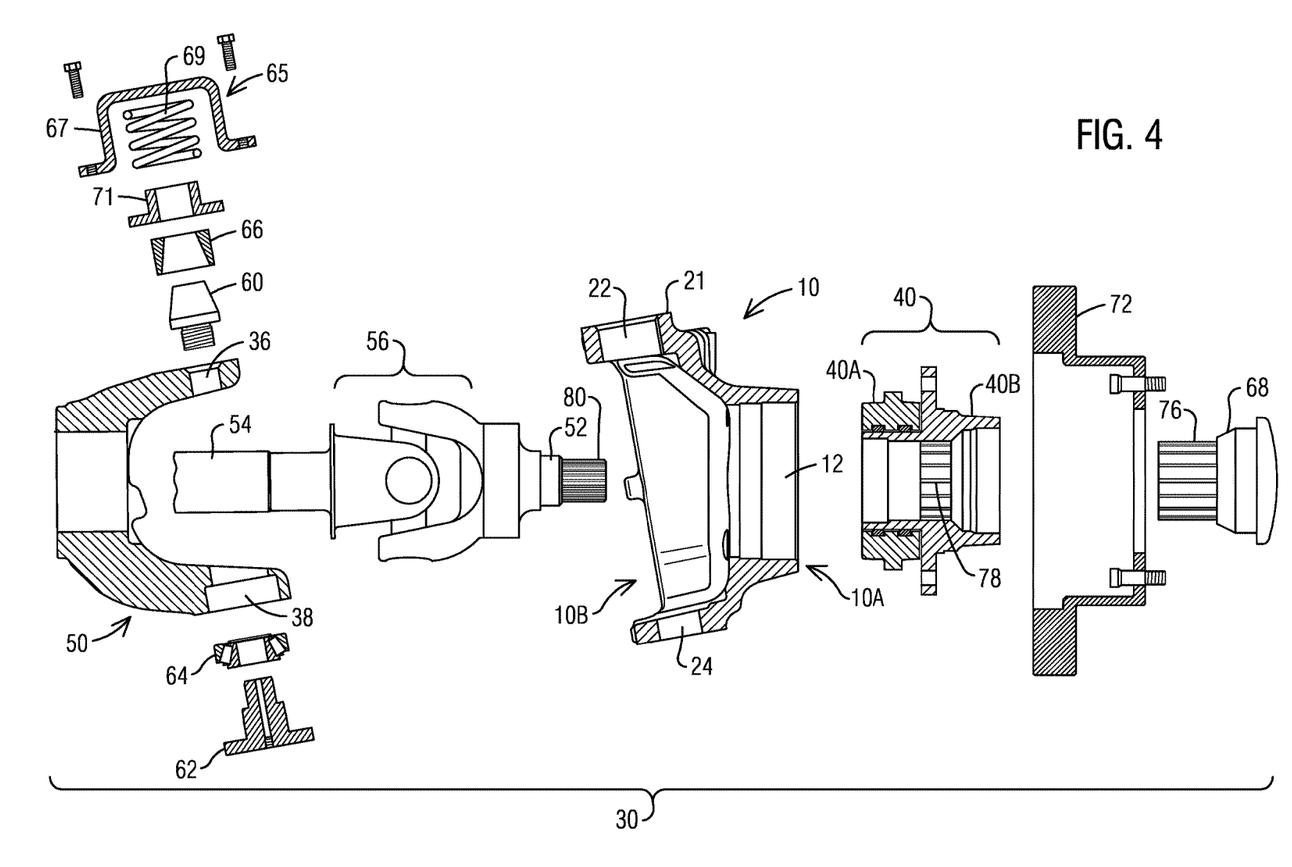
FIG. 4 is an exploded sectional view of a kingpin unit bearing steerable drive axle assembly in accordance with aspects of the invention.
Figure 5:
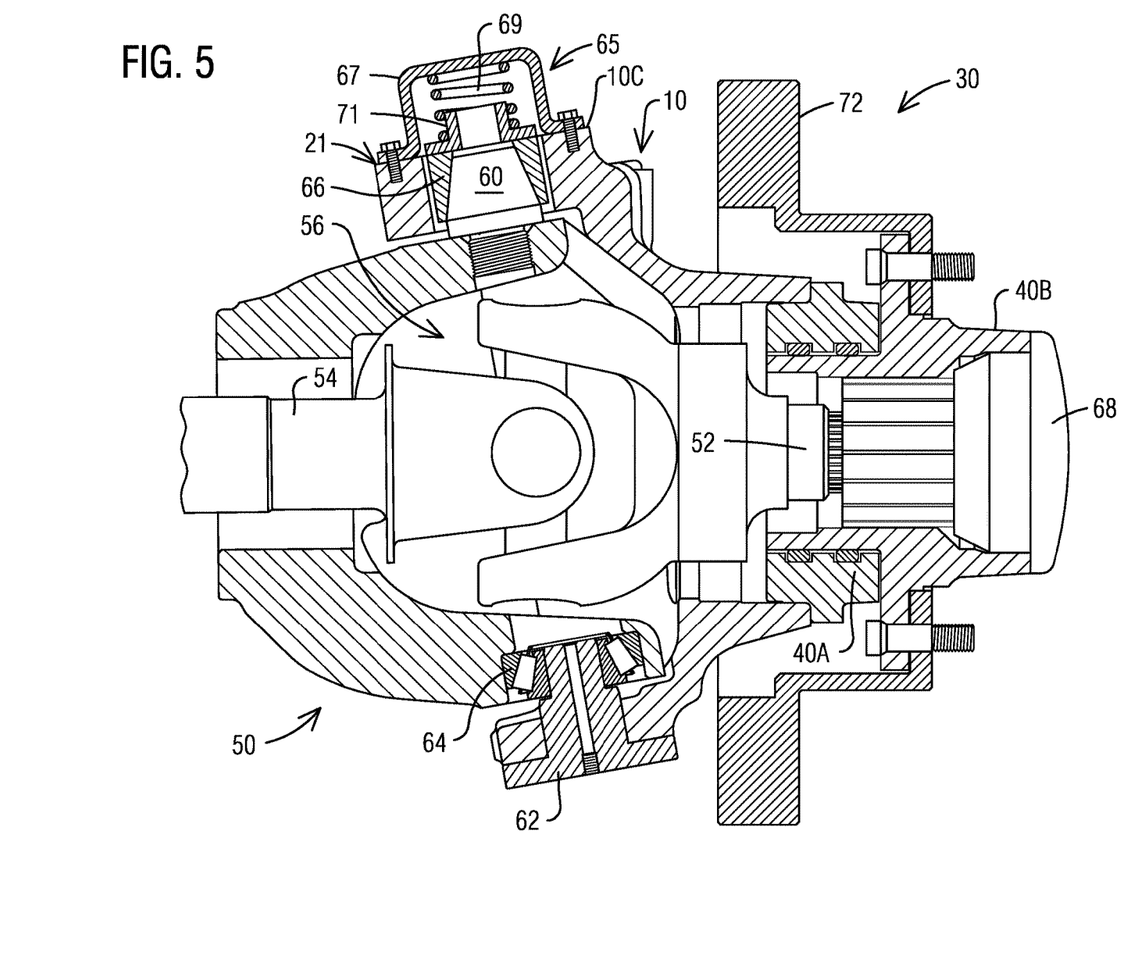
FIG. 5 is a sectional view of an assembled kingpin unit bearing steerable drive axle assembly in accordance with aspects of the invention.

In reference to FIGS. 4 and 5, there is illustrated a kingpin steerable drive axle assembly 30 including the steering knuckle 10, a unit bearing 40 and an axle housing 50. As shown, the knuckle 10 and axle housing 50 are configured to receive upper and lower kingpins 60, 62 respectively. The assembly of the unit bearing 40 and steering knuckle 10 is initiated by first securing the steering knuckle 10 to the axle housing 50 by securing upper and lower kingpins 60, 62 to the axle housing 50 and knuckle 10. More specifically, the axle housing 50 includes an upper arm 50A with an upper kingpin aperture 36 aligned with the upper kingpin aperture 22 of the knuckle 10. In addition, the axle housing 50 includes a lower arm 50B having a lower kingpin aperture 38 aligned with the lower kingpin aperture 24 of the knuckle 10.

As shown in FIG. 5, an upper kingpin assembly may include an upper kingpin 60 and a bushing 66. The bushing 66 may be retained in the aperture 60 of the axle housing 50 buy an OEM kingpin spring assembly as known to those skilled in the art. An OEM kingpin spring assembly 65 shown in FIG. 5 may include a housing 67 mounted to the top end 10C of the steering knuckle 10. A spring 69 is disposed within the housing 67 over a spring seat 71 and biased against the kingpin 60 and bushing 66.

Figure 6:
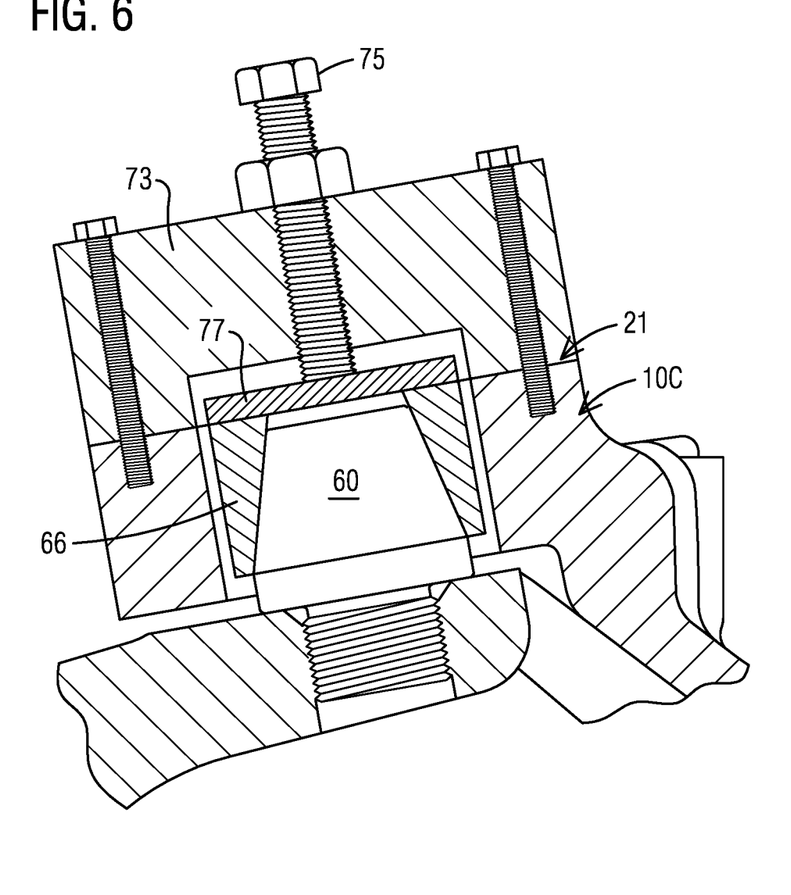
FIG. 6 is a sectional of an upper kingpin assembly and a high steer arm in accordance with aspects of the invention.

Alternatively, as shown in FIG. 6, the top mounting area 21 of the steering knuckle 10 may be configured for mounting a steering arm (not shown) or high steer arm 73. A load bolt 75 and load plate 77 may be operatively connected on the mounting area 21 of the knuckle 10 to retain the bushing 60 in the upper boring 36 under load. Such a steering arm 73 may be connected to the steering knuckle 10 to control pivoting motion of the knuckle 10 and control steering of a vehicle, especially for vehicles with larger wheels such as off-roading vehicles.

The lower kingpin 62 is a component of an assembly that also includes a roller bearing 64 that is positioned within the lower boring 38 of the axle housing 50. Bolts 74 may be used to fix the lower kingpin 62 in the knuckle 10 and axle housing 50. In addition, the roller bearing 64 is secured within the lower boring 38 of the axle housing 50.

As further shown, a stub shaft 52 is connected to an inner axle 54. More specifically, a universal joint 56 interconnects the inner axle 54 to the stub shaft 52. This assembly is then inserted through the boring 12 of the steering knuckle 10 and disposed within the axle housing 50 until the inner axle 54 has bottomed into the axle housing 50.

The unit bearing 40 is then mounted to the first side 10A of the steering knuckle 10 by bolting the unit bearing 40 to the knuckle 10. As shown, the unit bearing 40 includes a stationary component 40A that is bolted to the first side 10A of the knuckle 10 and a rotating component 40B that is operatively connected to the stub shaft. 52. Studs (not shown) protrude from a flange on the stationary component 40B and are inserted through apertures 14 on the first side 10A of the knuckle 10 and held in place with nuts on second side 10B of the knuckle 10.

A wheel hub 68 is inserted into the rotating component 40B of the unit bearing 40; and the wheel hub 68, which may be a vacuum activated lock-out hub, has external splines 76 that mate with internal splines 78 of the rotating component 40B. In addition, the stub shaft 52 includes external splines 80 that mate with internal splines (not shown) of the hub 68. Accordingly, as the inner axle 54 rotates the stub shaft 52 is rotated providing drive power to the wheel hub 68, which rotates the rotating component 40B of the unit bearing 40 and a wheel (not shown) mounted to the unit bearing 40. A brake rotor 72 is shown mounted to the unit bearing 40; and more specifically to the rotating component 40B of the unit bearing 40.

As noted above, the steering knuckle 10 is configured on one side (second side 10B) to mount to the axle house 50 using upper (first) and lower (second) kingpins 60, 62. The other side (the first side 10A) of the knuckle 10 is configured to receive the unit bearing 40, which may be an OEM unit bearing or an aftermarket unit bearing. An embodiment of the kingpin steerable drive axle assembly 30, including the above-described steering knuckle 10 and axle housing 50 may be configured to receive a drive axle (inner axle and stub shaft) with a unit-bearing typically used with heavier duty axles. For example, Dana Corporation is an axle supplier to OEM car companies. Dana Corporation manufactures a series of front driving axles that are used in all wheel drive vehicles ranging from small sport vehicles up to large industrial trucks and off road construction equipment. The axle families are typically designated by a number series wherein the larger number indicating a heavier axle. The most common axle in production now is the Dana 30 which is used primarily in JEEP vehicles. These are light weight sport vehicles and the axle is light duty. The largest being the Dana 70 drive axle.

While the preferred embodiments of the present invention have been shown and described herein, it will be obvious that such embodiments are provided by way of example only and not of limitation. Numerous variations, changes and substitutions will occur to those skilled in the art without departing from the teaching of the present invention. Accordingly, it is intended that the invention be interpreted within the full spirit and scope of the appended claims.

The invention claimed is:

1. A steering knuckle comprising:
    a first side configured to support an OEM unit bearing;
    a second side configured to receive an axle housing;
    a top end having an upper aperture configured to receive a first OEM kingpin assembly;
    a bottom end having a lower aperture configured to receive a second OEM kingpin assembly;
    a boring through the first side and second side of the steering knuckle and a plurality of apertures on the first side of the steering knuckle and the apertures are disposed about the boring in a configuration to receive fasteners to support the OEM unit bearing on the steering knuckle;
    wherein the top end includes a flat mounting area and a first set of apertures on the top end and within the mounting area and the apertures of the first set are arranged about the upper aperture for mounting a kingpin housing; and,
    a second set of apertures within the mounting area of the top end of the steering knuckle and the apertures of the second set are arranged about the upper kingpin aperture for mounting a high steer arm to the top end of the steering knuckle.

2. The steering knuckle of claim 1 wherein the steering knuckle is a component of a drive axle assembly, which comprises:
    an axle housing having an upper aperture configured to receive a first OEM kingpin and aligned with the upper aperture of the steering knuckle and having lower aperture configured to receive a second OEM kingpin and aligned with the lower aperture of the steering knuckle;
    a first OEM kingpin disposed within the upper apertures of the axle housing and the steering knuckle;
    a second OEM kingpin disposed within the lower OEM kingpin apertures of the axle housing and the steering knuckle; and,
    an OEM unit bearing mounted to the first side of the steering knuckle.

3. The steering knuckle of claim 2 wherein a high steer arm is mounted on the mounting area of the top end of the steering knuckle and over the first OEM kingpin and the steering arm has a recess to receive a head of the first OEM kingpin and a load plate disposed between the head of the kingpin and the high steer arm.

* * * * *